Patented Mar. 17, 1953

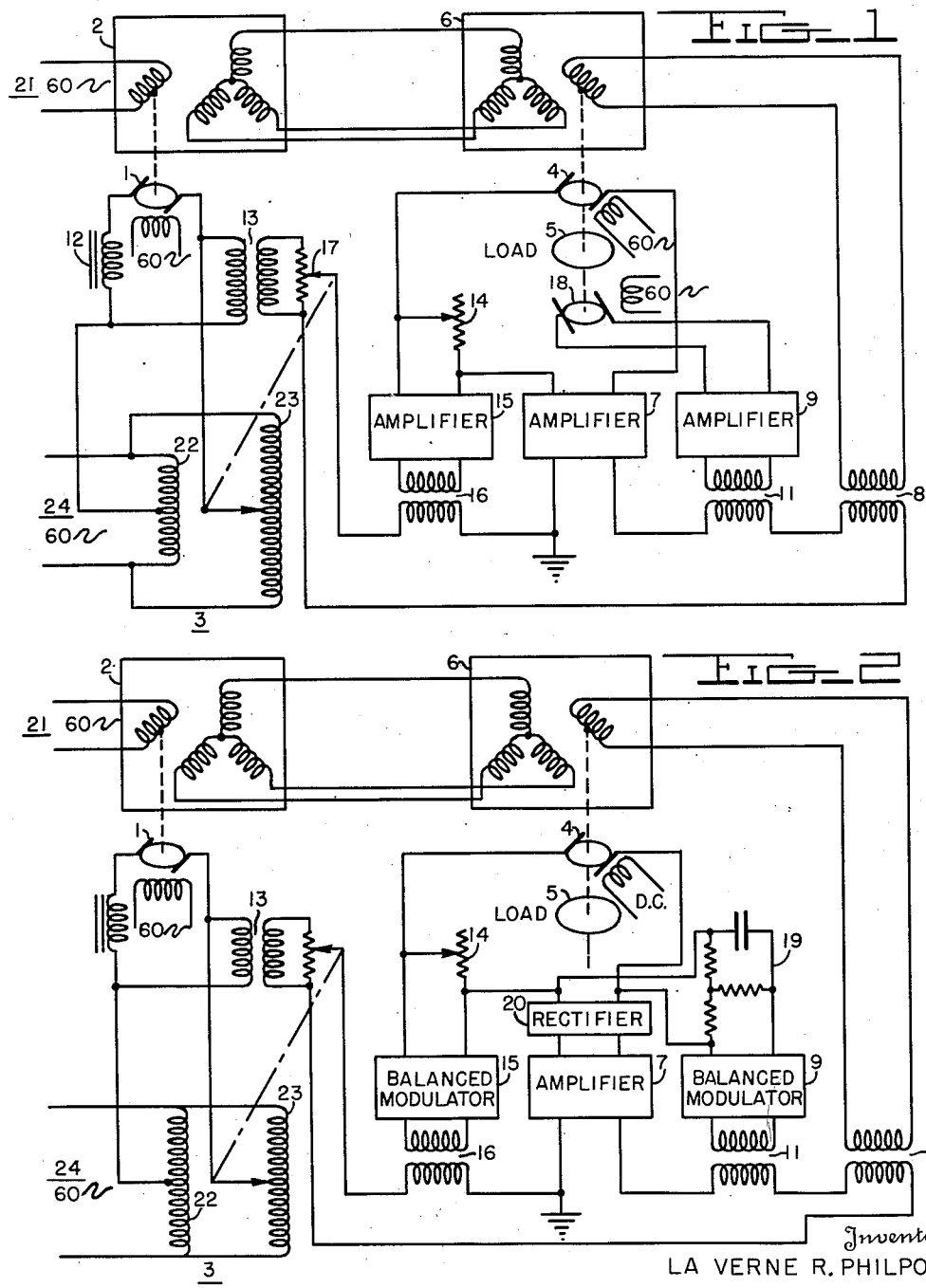

2,632,138

UNITED STATES PATENT OFFICE 2,632,138

AUTOMATIC FOLLOW-UP SYSTEM

La Verne R. Philpott, Washington, D. C.

Application June 11, 1946, Serial No. 676,049

7 Claims. (Cl. 318—30)

(Granted under Title 35, U. S. Code (1952), sec. 266)

This invention relates to automatic electrical position regulators of the follow up type, having an output driving motor responsive to movement of an input motor.

An object of this invention is to provide means for causing the shaft of an output motor to correspond in angular position with the shaft of an input motor, and for correcting angular miscorrespondence therebetween due to both the speed of the system and to dynamic loading of the output motor.

Another object of this invention is to provide in a follow up system of the type herein described a correction for the angular lag in position due to mechanical friction.

In general the load on the output motor in a follow up system of the type herein described has a certain amount of inertia as has the servo or follow up system itself. Therefore, when the follow up system is correcting an error, this inertia tends to cause overcorrection and as an external source of power is available, the conditions for mechanical oscillation or hunting are present.

A factor which tends to aggravate hunting is the presence of lags in the follow up system, that is, power is applied to the oscillatory system proportional not to the present error, but to the error a short time before. When the load is turning at a constant speed, conventional anti hunt feedback circuits generally tend to produce a velocity error, that is, a steady voltage is fed back in opposition to the error signal, therefore a greater error signal is required to correct a certain unbalance in the amplifier and a certain speed of the output motor, than would be required, if there were no anti hunt feedback. Since the feedback voltage is proportional to speed, the error is also proportional to speed.

Also the presence of mechanical friction, when the system is rotating, causes an angular lag between the input member position and the output member position, which is a function of the speed of rotation.

One of the objects of this invention is to reduce this error by injecting a correcting voltage into the system which is a function of the speed of the input member. This voltage is a portion of the speed control voltage of the input member, fed to the output member directly through its power amplifier. Thus, at the same time as the input speed is changed, a predetermined correction voltage is automatically applied directly to the output member, in such a manner as to minimize the angular lag caused by the speed of rotation.

Additional angular miscorrespondence may be caused by dynamic changes in the load on the output motor, causing it to fall out of correspondence in angular position with the input motor. These may be random changes in load or such effects as wind loading or gravity.

To correct for this condition a voltage proportional to the armature current of the output motor is taken, amplified and fed back to the power amplifier controlling the output motor. Thus a voltage proportional to the tractive effort of the output motor is fed back in such a manner as to tend to counteract any error in angular position. This directly applied correction minimizes the load on the error voltage system and anti hunt system and hence aids them in acting rapidly and with a minimum of hunting.

Other objects and features of the present invention will become apparent upon a careful consideration of the following detailed description when taken together with the accompanying drawings, in which:

Fig. 1 is a schematic diagram of an alternating current follow up system embodying the principles of the invention, and Fig. 2 is a schematic diagram of a direct current follow up system embodying the principles of the invention.

In Fig. 1 to which reference is now made reference numerals 1 and 4 represent respectively the input and output motor means comprising the invention. Each is for purposes of illustration, represented as being of the single phase commutator type A. C. motor. The input and output motors 1 and 4 respectively, are interconnected by a synchro system which comprises a synchro generator indicated at 2 and a synchro control transformer indicated at 6. The stator windings of the synchro generator 2 are Y connected to the stator windings of the transformer 6. The rotor winding of the synchro generator 2 is rotatably driven by the input motor 1 and is excited from a 60 cycle voltage source indicated at 21. The rotor winding of the synchro transformer 6 is rotatably driven by the output motor 4 and is connected to the primary winding of transformer 8. The secondary winding of the last named transformer is connected to the input of a suitable power amplifier 7 which may be, for example, either an amplidyne system or an ordinary vacuum tube system, the output of which provides armature current for the output motor 4. In this manner an angular displacement between the shafts of the input and output motors, 1 and 4 respectively will introduce a 60 cycle error voltage in the rotor of the synchro transformer 6 the magnitude of which will be dependent upon the amount of angular displacement. This error voltage is fed back through the transformer 8 and amplifier 7 to the armature of motor 4 and thereby corrects the angular displacement between the input and output motor shafts.

To prevent the error signal generated by the synchro transformer 8 from overcorrecting the angular miscorrespondence between the input and the output motors, a suitable anti hunt circuit may be added to the system. As herein illustrated the anti hunt device is represented as a small voltage generator tachometer 18 which is driven by the shaft of the output motor 4 and is arranged to produce a 60 cycle signal proportional in amplitude to the speed of the motor 4, and dependent in phase upon the sense of rotation. The anti hunt voltage signal is applied through a suitable amplifier 9 and transformer 11 to the input of the power amplifier 7 in series with the error signal from transformer 8, and in opposition thereto.

The system thus far described will provide reasonably good follow up operation. Due however, to mechanical friction, which is a function of speed the error signal generated at the synchro transformer 6 will never be sufficient to produce absolute correspondence between the input and output motor shafts, that is, there will always be a certain amount of lag in the output motor 4 called "velocity lag." The amount of lag is a function of the speed of the system. According to the invention this lag is compensated for by providing a speed controller indicated in general at 3, and comprising a mid tapped inductance 22 and a slidable tap inductance 23 connected in parallel and excited from a 60 cycle voltage source indicated at 24. The armature winding of input motor 1 is connected between the mid point of inductance 22 and the slidable tap of inductance 23 through a series phase correcting inductance 12. In this manner the speed controller 3 provides a zero speed setting at its mid point and reverse directions of rotation on opposite sides thereof.

The correction voltage responsive to the speed of the system is taken from across the speed control 3 voltage and fed to the input motor 1. Said correction voltage being applied to transformer 13, and a portion of the voltage across the secondary of the said transformer 13, is fed to the input of the power amplifier 7, in series with the error voltage across the secondary of transformer 8 and the anti hunt voltage across the secondary of transformer 11. This correction voltage is proportional to the speed of the input motor 1, and when applied to the input of amplifier 7 tends to change the speed of the output motor 4 in a direct relationship to the change of speed of the input motor 1, that is, if the input motor speed is increased the output motor speed is also increased. The exact amount of the correction voltage necessary in a given system at various speeds can be predetermined and adjusted by the potentiometer 17, in shunt with the secondary of transformer 13.

If the correction voltage required from potentiometer 17 is not a linear function of the speed control 3, then speed control 3 and potentiometer 17 may be mechanically ganged and potentiometer 17 may be specially wound, or a precut cam may be inserted in the mechanical linkage so that the voltage available at the movable tap on potentiometer 17 is that voltage necessary to change the speed of motor 4, to correspond with the speed of the input motor 1.

The correction voltage responsive to the dynamic changes in the load 5, previously mentioned is the voltage drop across adjustable resistor 14, in series with the armature of the output motor, said voltage being fed back to the power amplifier 7 through the amplifier 15, the input of which is in shunt with a portion of said resistor 14 and the output of which is in shunt with the primary of transformer 16, the secondary of which is in series with the other correction voltages of transformers 8, 11 and 13.

This voltage correction is a function of the tractive effort of the output motor 4. Any dynamic unpredictable change in the load 5 would if correction were not made, due to mechanical friction, cause a miscorrespondence in angular position between the input and output shaft members. Any change in load 5 will cause a change in armature current of the driving motor, and therefore a change in voltage across resistor 14. The voltage across resistor 14 is fed back in a regenerative manner to amplifier 7 to compensate for the change in load and thus bring the angular relationship of the input and output shaft members into more exact correspondence.

If there were no random or unpredictable loading on load 5, the voltage feedback from adjustable resistor 14 would be constant and might be taken care of by the potentiometer 17.

The necessary and sufficient conditions for stability are that properly proportioned signals should be inserted in a degenerative fashion which are a function of the angular velocity, and in a regenerative fashion, which are a function of the torque or tractive effort.

The value of resistor 14 entails the following considerations:

If resistor 14 had a relatively large value, a heavy surge of armature current caused by a suddenly applied load, might send a large regenerative feedback voltage through amplifier 7 and cause the motor 4 to speed up and draw more current and develop a greater voltage across resistor 14. This regeneration might cause the motor to run away. In this case the voltage across transformer 16 would greatly exceed the bucking voltage across transformer 11.

If potentiometer 17 is held constant and resistor 14 is critically adjusted for gradual changes of load, a sudden change might start it regenerating as above. Therefore resistor 14 must be made enough smaller than this critical value above, to insure stability, and then the correction as far as fixed or known loading is concerned is introduced by the potentiometer 17.

Fig. 2 shows a direct current system which operates in the same manner as the circuit of Fig. 1, but in this case the output motor 4 is a direct current motor the shaft of which is mechanically connected to the load 5, and to the rotor of synchro transformer 6 which operates in the same manner as described to generate and feed back an error signal. The direct current motor requires a direct current output from the control amplifier 7, therefore, a rectifying output means 20 has been added across the output of amplifier 7.

The antihunt feedback voltage is taken across the output of the rectifier 20, which is shunted by a differentiating circuit 19, the output of which is in shunt with the input of the balanced modulator amplifier 9, the output of which is fed through transformer 11 to the input of amplifier 7 as previously described. Balanced modulators are incorporated in amplifier 9 and amplifier 15 in order to change the direct current input voltages to an alternating current output voltages.

The correction responsive to dynamic changes in load will also be a direct current voltage developed across a portion of resistor 14, which is in series with the armature of the output motor 4. Said voltage developed across resistor 14 is in shunt with the input of balanced modulator 15 which converts the direct current voltage input into an alternating current voltage output.

The correction responsive to speed is not changed from the circuit of Fig. 1 as that portion of the system is still an alternating current voltage system.

Although I have shown and described only limited and specific embodiments of the invention I am fully aware of the many modifications possible thereof. Therefore this invention is not to be limited except insofar as is necessitated by the spirit of the prior art and the scope of the appended claims.

The invention described herein may be manufactured and used by or for the Government of the United States of America for governmental purposes without the payment of any royalties thereon or therefor.

What is claimed is:

1. In an automatic follow up system having input and output motor means; the combination of, synchro means associated with said motor means for providing an error voltage to said output motor means responsive to angular miscorrespondence between said input and output motor means, amplifier means driving said output motor means in response to a control voltage, a speed control voltage means associated with said input motor means and operative to control the speed thereof, means coupling a portion of said speed control voltage in series with the error voltage from said synchro means to said amplifier means as the control voltage for driving said output motor means so as to compensate for a velocity error in angular correspondence.

2. In an automatic follow up system having input and output motor means; the combination of, synchro means associated with said motor means for providing an error voltage to said output motor means responsive to angular miscorrespondence between said input and output motor means, amplifier means driving said output motor means in response to said error voltage, a voltage means responsive to the dynamic loading of said output motor means comprising an impedance element in series with the armature of said output motor means, and coupling means for applying the voltage developed across said impedance to said amplifier means so as to compensate for dynamic loading errors in angular correspondence.

3. In an automatic follow up system having input and output motor means; the combination of, synchro means associated with said motor means for providing an error voltage to said output motor means responsive to angular miscorrespondence between said input and output motor means, a speed control voltage means associated with said input motor means and operative to control the speed thereof, and means associated with said last named means for applying a portion of said speed control voltage to said output motor means so as to compensate for a velocity error in angular correspondence, and a voltage means responsive to the dynamic loading of said output motor means, for applying a voltage to said output motor means so as to compensate for dynamic loading errors in angular correspondence.

4. In an automatic follow up system having input and output motor means; the combination of, synchro means associated with said motor means for providing an error voltage to said output motor means responsive to angular miscorrespondence between said input and output motor means, a voltage means responsive to the dynamic loading of said output motor means comprising an impedance element in series with the armature of said output motor means, and coupling means for applying the voltage developed across said impedance to said output motor means so as to compensate for dynamic loading errors in angular correspondence.

5. In an automatic follow up system having input and output motor means; the combination of, synchro means associated with said motor means for providing an error voltage to said output motor means responsive to the angular miscorrespondence between said input and output motor means, a speed control voltage means associated with said input motor means operative to control the speed thereof, and means associated with said last named means for applying a portion of said speed control voltage to said output motor means, comprising a transformer, the primary of which is excited by the speed controlling voltage of said input motor means and coupling means for applying a portion of the voltage across the secondary of said transformer to said output motor means so as to compensate for velocity errors in angular correspondence.

6. In an automatic follow up system having input and output motor means; the combination of, synchro means associated with said motor means for providing an error voltage to said output motor means responsive to angular miscorrespondence between said input and output motor means, a voltage means responsive to the dynamic loading of said output motor means comprising a resistor in series with the armature of said output motor means and amplifier means for applying the voltage across a portion of the said resistor to the input of said output motor means so as to compensate for dynamic loading errors in angular correspondence, and a speed control voltage associated with said input motor means and operative to control the speed thereof, and means associated with said last named means for applying a portion of said speed control voltage to the output motor means, comprising a transformer the primary of which is excited by the speed controlling voltage of said input motor means and amplifier means for applying a portion of the voltage across the secondary of said transformer to the input of said output motor means, so as to compensate for velocity errors in angular correspondence.

7. In an automatic follow up system having input and output motor means; the combination of, synchro means including an amplifier circuit associated with said motor means for providing an error voltage to said output motor means responsive to angular miscorrespondence between said input and output motor means, an anti-hunt signal generator associated with said output motor means for delivering an anti-hunt voltage signal to said output motor means in opposition to that provided by said synchro means, a speed control circuit adapted to deliver a speed controlling signal to said input motor means, coupling means connected to said speed control circuit for applying a predetermined portion of said speed control signal to said output motor means, impedance means connected in the path of armature current flow through said output motor means, and coupling means for applying the signal developed across said impedance means to the input of said output motor means to thereby compensate for errors in angular correspondence due to dynamic loading of said output motor means.

LA VERNE R. PHILPOTT.

REFERENCES CITED

The following references are of record in the file of this patent:

UNITED STATES PATENTS

| Number    | Name             | Date           |
|-----------|------------------|----------------|
| 1,299,509 | Rey              | Apr. 8, 1919   |
| 1,586,233 | Anschutz-Kaempfe | May 25, 1926   |
| 2,151,718 | Riggs            | Mar. 28, 1939  |
| 2,407,876 | Godet            | Sept. 17, 1946 |
| 2,414,384 | Moseley          | Jan. 14, 1947  |